Dec. 2, 1941.   L. W. HILLS ET AL   2,264,844
ROTARY VALVE STRUCTURE
Filed Oct. 25, 1939   2 Sheets-Sheet 1

Inventors
Leslie W. Hills
Lawrence E. Warner
By Lyon & Lyon
Attorneys

Patented Dec. 2, 1941

2,264,844

UNITED STATES PATENT OFFICE 2,264,844

ROTARY VALVE STRUCTURE

Leslie W. Hills, San Francisco, and Lawrence E. Warner, Oakland, Calif., assignors to Hills Bros. Coffee, Inc., San Francisco, Calif., a corporation of California Application October 25, 1939, Serial No. 301,208

6 Claims. (Cl. 198—209)

This invention relates to rotary valve structures, and more particularly to a transfer valve structure as used in the transfer of material from a zone of high pressure to a zone of lower pressure as, for example, in the transfer of canned material into a vacuum sealing machine.

This invention is particularly related to the provision in such a valve structure of a pressure shoe which is provided with pressure compensating means so as to enable the use of such a rotary valve and pressure shoe without undue wear upon the operating parts thereof, and yet provide an air-tight seal at all times.

It is an object of this invention to provide a pressure shoe for a rotary valve structure which will operate to maintain a low pressure chamber seal within the rotating valve structure, and wherein means are provided for compensating the pressure shoe so as to avoid the overheating of the pressure shoe or the operation of the structure to more than a minimum of friction between the rotating valve member and the shoe.

Another object of our invention is to provide a pressure shoe for a rotary valve wherein the pressure shoe is so constructed and mounted as to permit of initial simplicity of machining of the mating surface of the shoe with the cylindrical valve.

Another object of our invention is to provide in a rotary valve structure a pressure shoe and a means of mounting the pressure shoe so as to enable the same to be easily removed for servicing the pressure surface thereof or of the rotary valve or for cleaning or lubrication of the parts thereof.

Another object of this invention is to provide in a rotary valve a pressure shoe wherein the pressure valve shoe is so mounted with relation to the cylindrical valve member that the greater the friction between the valve shoe and the cylindrical valve member, the greater the counterbalancing force which will act to reduce the friction.

Other objects and advantages of this invention it is believed will be apparent from the following detailed description of a preferred embodiment thereof as illustrated in the accompanying drawings.

Figure 1:
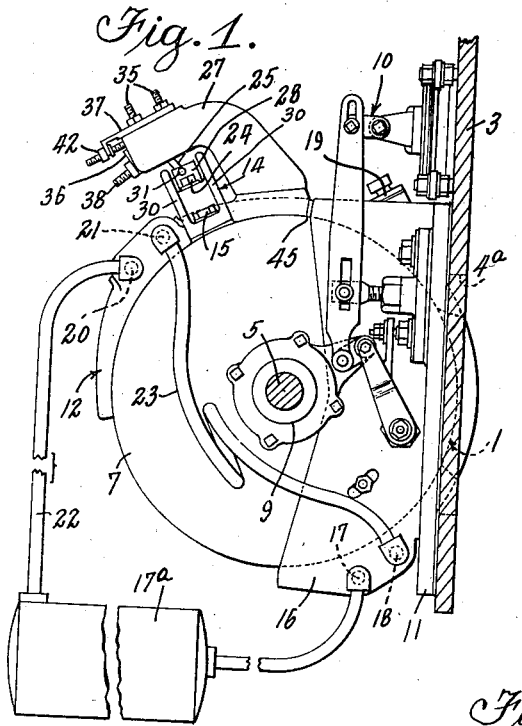
Figure 1 is a plan view diagrammatic in form of the rotary valve structure incorporating therein our invention.
Figure 2:
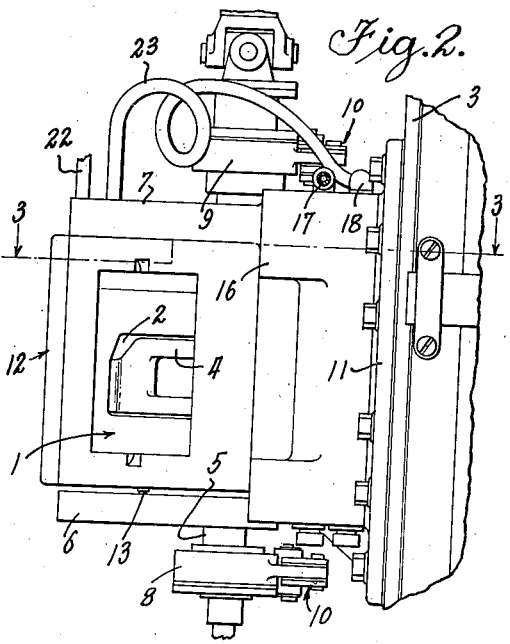
Figure 2 is a side elevation thereof.

The valve structure as herein illustrated is of the general character of that illustrated in Patent No. 2,192,441, for Valve structure, although the details of construction as therein illustrated are not in any way essential to the invention as herein disclosed which has primarily to do with the provision of the pressure shoe which operates in conjunction with the rotating valve member of such a transfer valve.

In the illustration of our invention as given, the rotating valve member 1 is illustrated as comprising a plurality of pockets 2, which are transfer low pressure pockets into which cans of material to be vacuumed sealed are delivered in any suitable manner to be transferred into the vacuum chamber, a portion of the shell of which is indicated at 3. This form of structure is well known in the art so its specific details are not herein particularly described or set forth.

As is common in such structures, the pockets 2 of the rotary valve member 1 are provided with ejecting members 4 which operate in timed relation with the rotation of the valve member 1 to eject the cans from the pockets 2 through the opening 4ª formed in the shell 3 of the vacuum chamber.

The rotary valve member 1 is mounted upon a shaft 5 and is provided with upper and lower plates 6 and 7. The shaft 5 is rotatably journaled in bearings 8 and 9, which bearings 8 and 9 may be supported in any suitable or desirable manner, either through the medium of the pressure compensating support generally indicated at 10 from the supporting plate 11 secured to the shell 3, or the shaft bearings 8 and 9 may, as is common in some forms of such valve, be rigidly mounted.

Figure 4:
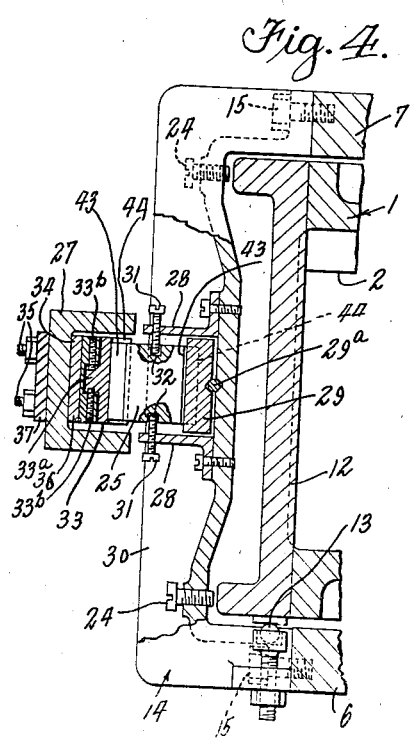
Figure 4 is a fragmental sectional view taken substantially on the line 4—4 of Figure 3.
Figure 5:
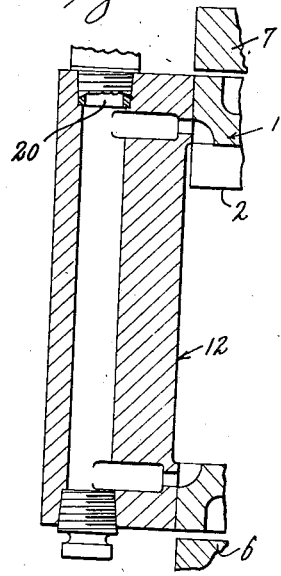
Figure 5 is a fragmental sectional view taken substantially on the line 5—5 of Figure 3.
Figure 6:
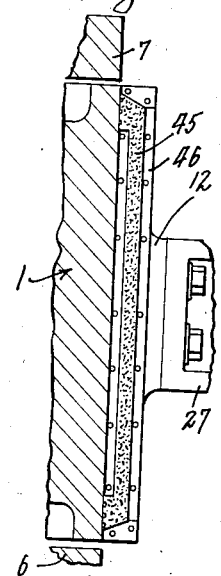
Figure 6 is a fragmental sectional view taken substantially on the line 6—6 of Figure 3.

The plate 11 as illustrated is an integral part of the valve seat 16 and carries the upper and lower closure plates 6 and 7. Mounted to operate in conjunction with the rotary valve member 1 is a pressure shoe 12 which engages the periphery of the valve member 1 to form a fluid-tight seal therewith. The shoe 12 is supported at its lower end upon the lower plate 6 and as herein illustrated, is supported so as to have freedom of movement by means of a bearing 13 (Figure 4) which is carried by a bracket 14 secured to the lower and upper plates 6 and 7, respectively, by means of suitable securing means 15.

Means are provided in this type of equipment for establishing a partial vacuum within the transfer pockets 2. As herein illustrated, the rotary valve to which my invention is adapted is of the single transfer type, that is, the type which takes the contents to be vacuum sealed from the conveyer and transfers the same into the vacuum chamber of the shell 3 and in this type of equipment a second similar transfer valve would be employed for removing the vacuum sealed cans from the vacuum sealing chamber. As the construction and operation of such parts are common in the art, we believe that it is unessential to completely describe in detail their mode of operation.

In addition to the pressure shoe 12, the rotary valve member 1 also revolves against a seat 16 carried also by the plate 11 through which seat 16 the can admittance opening 4ª is formed. As is customary in such structures, the seats 16 and pressure shoe 12 are each provided with means wherein the vacuum within the pockets 2 may be properly controlled. Thus the valve seat 16 is provided with vacuum control ports 17, 18, 19 and the pressure shoe 12 is provided with vacuum control ports 20 and 21. These ports are properly connected through conduits as, for example, the conduits 22 and 23 for the control and maintenance of the requisite vacuum.

The control ports 18 and 21 are exactly opposite so that the outcoming chamber 2 with a full high vacuum is connected with a partially vacuumized entering chamber. The outcoming chamber 2 is then connected through the port 17 to a fixed chamber 17ª connected with the port 20. This chamber 17ª makes connection through the port 20 with the next incoming and unevacuated valve chamber. Since air in unevacuated pockets is displaced into empty outgoing pockets, these ports and connections save the need for great capacity of the vacuum pump engaged in vacuumizing the main chamber into which the cans are conveyed by the rotating valves.

It will be obvious, as is well known in the art, that the valve port 19 may be connected to a lower vacuum system than the main chamber.

The method and means of maintaining the requisite vacuum in the pockets 2 is well understood, and in this case the only difference is that the conduits 22 and 23 are formed flexible so that they do not resist or interfere with the movement of the pressure shoe 12. The pressure shoe 12 is normally held in position by means of adjustment screws 24 carried by the bracket 14. The bracket 14 also provides a means whereby there may be interposed between the pressure shoe 12 and the said bracket an off-center toggle link member 25 which is positioned in a position so that as the pressure shoe 12 moves in a direction corresponding with the direction of movement of the member 1 as indicated by the arrow 26, the toggle 25 tends to raise the pressure shoe 12 away from the valve member 1. As the pressure shoe 12 tends to move in the direction of the arrow 26 only when the frictional resistance between the shoe and rotary valve member 1 increases, it will be obvious that by lifting the pressure shoe 12 away from the valve member 1, this tendency toward increased frictional resistance to rotation of the member 1 is compensated for. In order to accomplish this result, the pressure shoe 12 is provided with a toggle supporting member 27 which extends out from the shoe 12 and over the bracket 14. The bracket 14 is provided with a pair of toggle link support members 28 between which a toggle link block 29 is mounted. The toggle link block 29 is also mounted between vertical walls 30 of the bracket 14 so that it is restrained from movement.

Carried by the members 28 are pivot pins 31 which are threaded to the members 28 and fit loosely within sockets 32 formed in the toggle link 25 and provide a means of holding the toggle link 25 in position during the assembly or disassembly of the apparatus.

Figure 3:
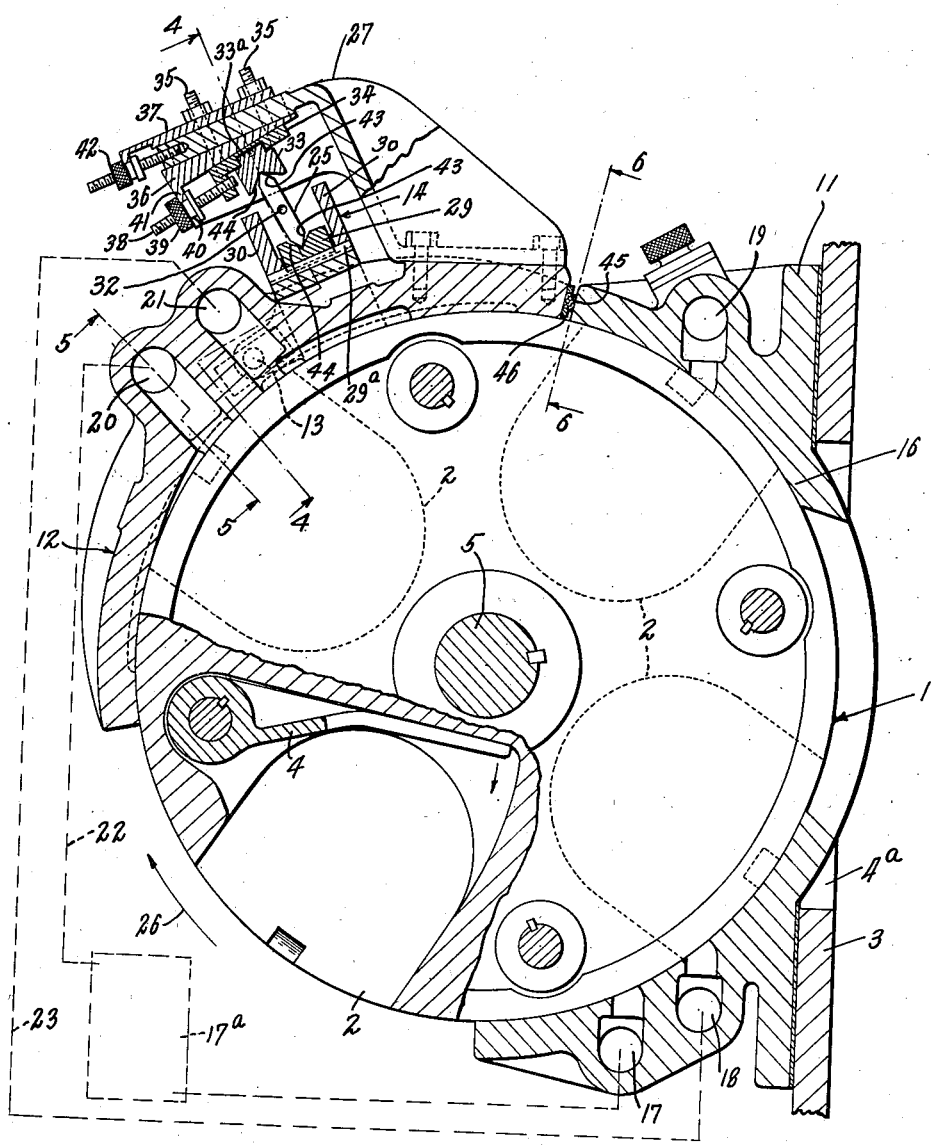
Figure 3 is a sectional plan view taken substantially on the line 3—3 of Figure 2.

The opposite end of the toggle link 25 engages within a second toggle link block 33 carried in an adjustment block 34. The adjustment block 34 is carried by the toggle link support 27 through the medium of a pair of bolts 35 which pass through slots formed in the support 27 so as to be movable with respect thereto in the direction of the plane of the drawing in Figure 3.

Interposed between the block 34 and the supporting member 27 is a wedge adjustment block 36. The bolts 35 are fitted through a corresponding adjustment plate 37. Carried by the member 34 is a screw 38 upon which there is mounted a recess adjustment nut 39, the peripheral recess 40 of which is engaged within the section 41 of the wedge member 36 so that upon rotation of the nut 39 the wedge 36 may be adjusted between the block 34 and the support 27. A similar adjustment means 42 is provided between the plate 37 and the support 27 so that a corresponding movement of the plate 37 may be had to properly align the bolts 35.

The adjustments thus provided for the blocks 29 and 33 are for the purpose of enabling a change to be made in the mechanical advantage or compensation provided through the toggle link 25 by changing its acting angle and to compensate for wear in the toggle link pivots or other wearing parts as well as to allow for an adjustment on initial assembly. The toggle block 29 is mounted on a pin 29ª which enables the block to rotate to equalize the pressure over the full length of the chisel point of the toggle link 25 to prevent pressure localization.

The toggle block 33 has a trunnion 33ª around which it may swivel for the purpose of preventing pressure localization of the bearing points of the toggle link 25.

The set screws 33ᵇ project into the trunnion 33ª into an annular groove so as to allow the block 33 to turn and self-align. The set screws 33ᵇ act to hold the block 33 in position when assembling and on disassembling.

The toggle member 25 having knife-edge bearings 43 at its opposed ends engages within bearing grooves 44 formed in the respective toggle blocks 29 and 33. By the medium of the adjustments as herein described, it will be obvious that the initial pressure between the pressure shoe 12 and the valve member 1 may be established so that a fluid-tight connection is at all times maintained. It will also be obvious that through this adjustment the amount of movement of the pressure shoe 12 requisite to cause a shifting of the same away from the member 1 may also be determined.

It will thus be observed that the pressure shoe 12 gives the advantage of a full seat, yet it is so mounted as to enable it to be quickly removed for inspection of the valve, shoe and ports for cleaning and lubrication. Through the use of such a pressure shoe a smaller rotary valve may be employed because the pressure shoe enables an extension of the prevacuumizing section of the valve seat, allowing either a longer period for prevacuumizing or else a higher speed of operation.

In order to form a fluid-tight connection between the pressure shoe 12 and the valve seat 16, a sealing means consisting of a strip 45 of suitable sealing material such as neoprene is interposed between the adjacent edges of the valve seat 16 and the pressure shoe 12. This strip of neoprene is carried by a suitable frame 46 secured to the end of the pressure shoe 12 and projects from this frame to engage the adjacent edge of the valve seat 16 to form a fluid-tight compressible connection between these two members. The use of this compressible material permits the pressure shoe 12 to have the requisite movement required for its compensating action as herein described.

Having fully described our invention, it is to be understood that we do not wish to be limited to the details herein set forth, but our invention is of the full scope of the appended claims.

We claim:

1. In a valve, a rotatable valve member having a chamber therein, a pressure shoe adapted to engage the rotating valve member and being in open communication with the said chamber, a support for the pressure shoe, and a link mechanism interposed between the support and the pressure shoe in off center relationship in the direction of rotation of the rotatable valve member whereby movement of the valve shoe in the direction of rotation of the rotatable valve member operates through the said link to move the valve shoe away from the rotatable valve member.

2. In a valve, a pressure shoe, a rotatable valve member having a chamber therein, means for creating a pressure difference between the pressure shoe and the rotatable valve member in the said chamber as compared with the external pressure on the valve shoe whereby the valve shoe and rotatable valve member are urged together, means for supporting the valve shoe, said latter means including a link interposed between the valve shoe and the said support in position of off-center relationship in the direction of rotation of the rotatable valve member, whereby movement of the valve shoe in the direction of rotation of the valve member as occasioned by the pressure contact between the shoe and the rotatable valve member operates through said link to raise the valve shoe away from the rotatable valve member.

3. In a valve, a rotatable valve member having a chamber therein, means for rotatably supporting the rotatable valve member, a floating pressure shoe adapted to engage the rotating valve member to close the said chamber, and a link mechanism interposed between a support and the pressure shoe, means for pivotally supporting the link mechanism in off-center relationship in the direction of rotation of the rotatable valve member whereby movement of the pressure shoe in the direction of rotation of the valve member operates through said link to move the pressure shoe away from the rotatable valve member.

4. In a valve, a rotatable valve member having a chamber therein, a pressure shoe adapted to engage the rotating valve member to close the said chamber, means for rotatably supporting the valve member, a link, means for pivotally supporting the link, a link block carried by the pressure shoe to engage one end of the link, a link block to engage the other end of the link, and means for adjusting the position of one of said link blocks so that the link is maintained in off-center relationship with reference to its said axis whereby movement of the pressure shoe in the direction of rotation of the rotatable valve member operates through said link to move said pressure shoe away from the rotatable valve member.

5. In a valve, a rotatable valve member having a peripheral chamber therein, a pressure shoe adapted to engage the periphery of the rotatable valve member to close the said chamber when the rotatable valve member is rotated to move the said chamber under the pressure shoe, a stationary seat for the valve, means for supporting the pressure shoe so as to permit the same to move in the direction of rotation of the rotatable valve member, and a yielding seal interposed between the pressure shoe and the stationary valve seat.

6. In a valve, a rotatable valve member having a peripheral chamber therein, a pressure shoe adapted to engage the periphery of the rotatable valve member to close the said chamber when the rotatable valve member is rotated to move the said chamber under the pressure shoe, a stationary seat for the valve, means for supporting the pressure shoe so as to permit the same to move in the direction of rotation of the rotatable valve member, a yielding seal interposed between the pressure shoe and the stationary valve seat, and means operatively connected with the pressure shoe whereby movement of the pressure shoe in the direction of rotation of the rotatable valve member operates to move the pressure shoe away from the rotatable valve member.

LESLIE W. HILLS.
LAWRENCE E. WARNER.